Aug. 16, 1932.  W. R. COUGHTRY  1,872,250
CLUTCH
Filed Aug. 7, 1929    2 Sheets-Sheet 1
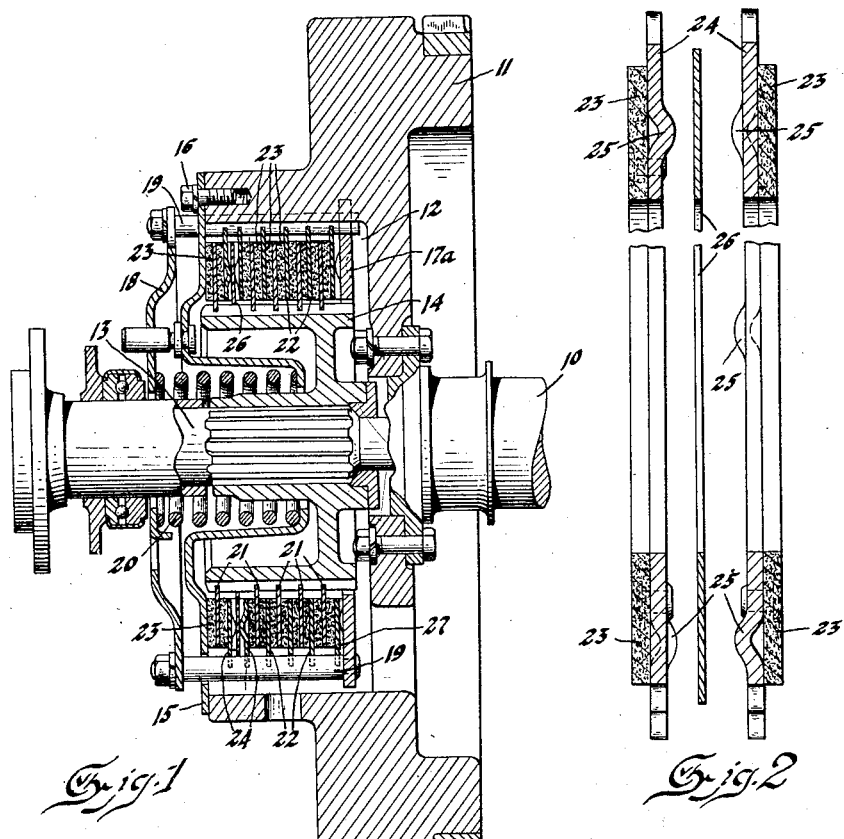
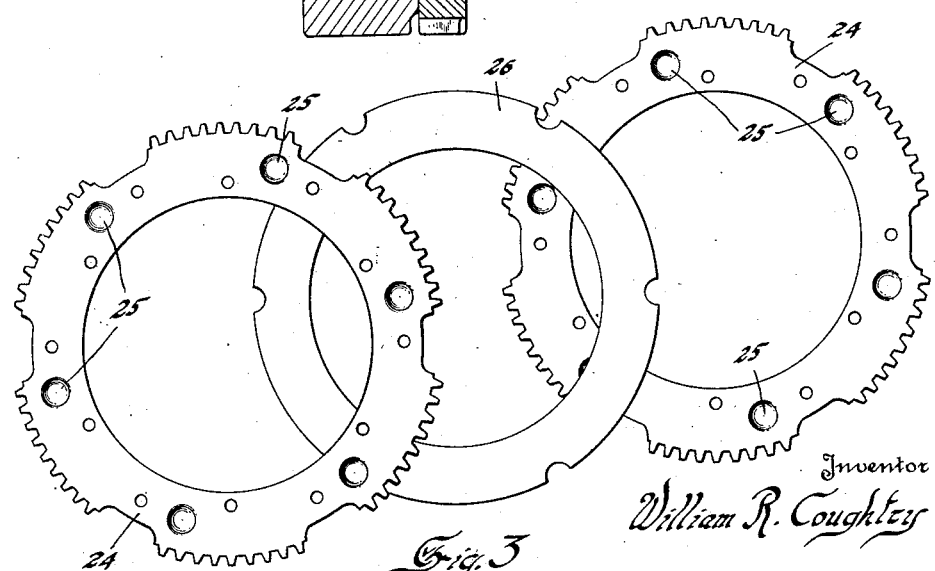
Inventor
William R. Coughtry
By Blackmore, Spencer & Nuth
Attorneys Aug. 16, 1932. W. R. COUGHTRY 1,872,250
CLUTCH
Filed Aug. 7, 1929 2 Sheets-Sheet 2
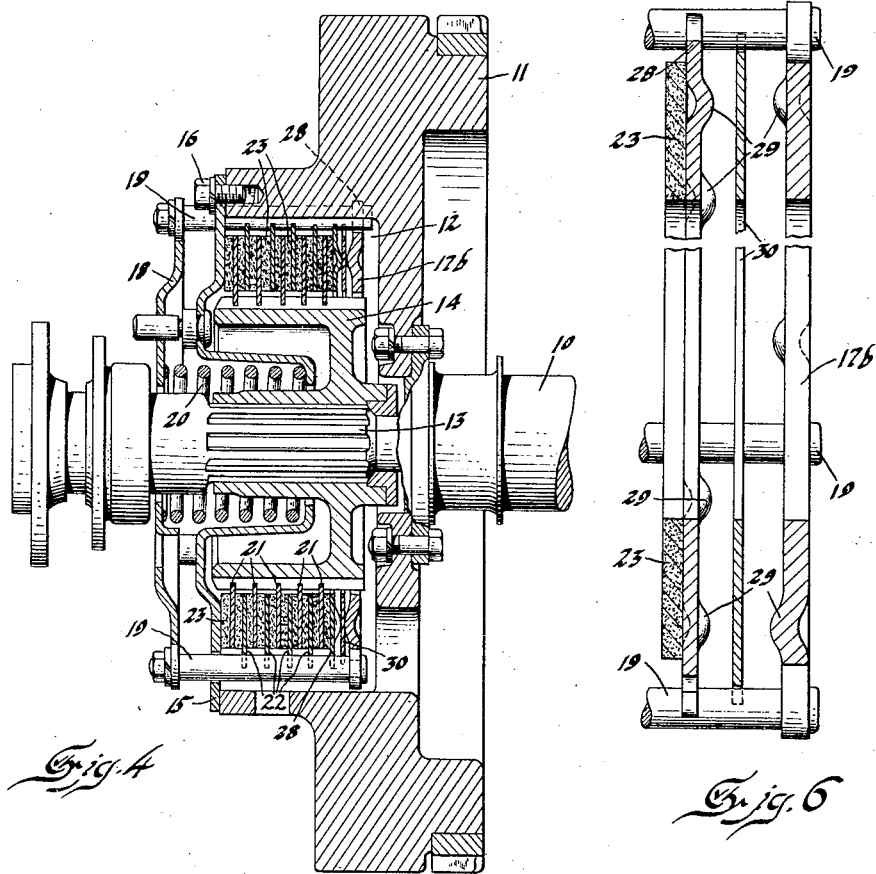
Fig. 4
Fig. 6
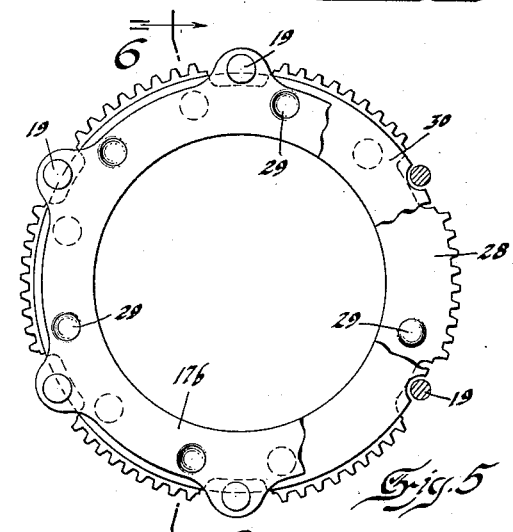
Fig. 5
Inventor
William R. Coughtry
By Blackmore, Spencer & Flint
Attorneys Patented Aug. 16, 1932

1,872,250

UNITED STATES PATENT OFFICE

WILLIAM R. COUGHTRY, OF FLINT, MICHIGAN, ASSIGNOR TO GENERAL MOTORS CORPORATION, OF DETROIT, MICHIGAN, A CORPORATION OF DELAWARE

CLUTCH

Application filed August 7, 1929. Serial No. 384,010.

To insure smooth and even engagement of the driving and driven discs when the clutch is thrown in, and to insure quick and sharp separation of the driving and driven discs when the clutch is thrown out, it has become rather common to employ distorted or warped discs in multiple disc clutches of the type which are used to connect the engine to the transmission of an automotive vehicle. It has been found that friction facings secured to distorted or warped discs of a clutch of the type described wear unevenly, and that jerky engagement and release of the driving and driven discs and chattering and other noises result.

It is the object of this invention to provide a multiple disc clutch so constructed and arranged as to insure smooth and even engagement of the driving and driven discs when the clutch is thrown in, and to insure quick and sharp separation of the driving and driven discs when the clutch is thrown out, without using distorted or warped discs, thereby eliminating uneven wear of the clutch facings and the other undesirable consequences which result from the use of such discs.

For a better understanding of the nature and the objects of the present invention, reference is made to the following specification in which are described the preferred embodiments of my invention which are illustrated in the accompanying drawings.

In the accompanying drawings:

Figure 1 is a longitudinal section through the clutch and associated parts of an automotive vehicle in which is embodied my invention.

Figure 2 is an enlarged exploded view showing in section a pair of the driving discs and the interposed resilient ring shown in Figure 1.

Figure 3 is an exploded view showing in side elevation the pair of discs and the resilient ring shown in the preceding figures.

Figure 4 is a longitudinal section through the clutch and associated parts of an automotive vehicle in which is embodied a slightly modified form of my invention.

Figure 5 is an end elevation, with parts broken away, of the clutch disc assembly shown in Figure 4.

Figure 6 is an enlarged, fragmentary section taken on the line 6—6 of Figure 5.

In the drawings, the reference character 10 indicates the crankshaft of an internal combustion engine to which is rigidly secured a flywheel 11 in which is provided a cylindrical recess 12 which is coaxial with the crankshaft. The transmission shaft 13, which is adapted to be driven by the engine, is coaxial with the crankshaft and extends into the recess 12. The clutch hub 14 is coaxial with the transmission shaft and is non-rotatably secured thereto within the recess 12. The rear end of the recess 12 is closed by a member 15 which is secured to the flywheel by means of screws 16. The front clutch release plates, which is indicated by the reference character 17a in Figures 1 to 3 and by the reference character 17b in Figures 4 to 6, surrounds a portion of the forward end of the clutch hub 14. The rear clutch release plate 18 is located to the rear of the member 15 and is secured to and spaced from the front clutch release plate by studs 19 which extend through the member 15 and thus maintain the front and rear clutch release plates non-rotatable with respect to the flywheel. The clutch release plate assembly, which includes the front and rear clutch plates and the studs 19, is constantly urged rearwardly by the clutch spring 20.

For connecting the transmission shaft operatively to the crankshaft there are provided on the clutch hub a plurality of annular driven discs 21 which are axially movable, but rotatably immovable, with respect thereto.

In the modification of my invention which is illustrated in Figures 1–3 of the drawings, there are provided between each pair, except one, of the driven discs 21 an annular driving disc 22, on both faces of which is provided a friction facing 23. Between the excepted pair of driven discs there are located two annular driving discs 24, of which each is provided on its outer face with a friction facing 23. On the juxtaposed faces of the two driving discs 24 there are formed a plurality of equi-circumferentially spaced projections 25, which are so arranged that when the discs are assembled each projection on one disc is equally spaced between a pair of the projections on the other disc. Between the driving discs 24 and in engagement with the projections 25 thereon is located a normally plane and undistorted ring 26 of a suitable resilient material, such as steel. To the front face of the member 15 is secured a friction facing 23 which is adapted to engage the rear face of the rear driven disc 21. In front of the front driven disc 21, and located between it and the front clutch release plate, is a driving disc 27 on the rear face of which is provided a friction facing 23. Each of the driving discs 22, 24 and 27 and the resilient ring 26 are secured to the flywheel so as to be axially movable but rotatably immovable with respect thereto.

In the modification of the invention illustrated in Figures 4-6 of the drawings, there are provided between each pair of the driven discs 21 a driving disc 22 on both faces of which is provided a friction facing 23. On the inner face of the member 15, there is provided as in the modification of the invention illustrated in Figures 1 to 3, a friction facing 23. Between the front driven disc and the front clutch release plate, there is located a driving disc 28 carrying on its rear face a friction facing 23. On the juxtaposed faces of the front driving disc 28 and the front clutch release plate 17b, there are formed a plurality of equi-circumferentially spaced projections 29, which are so arranged that when the disc and the plate are assembled, each of the projections on the disc and plate is equally spaced between a pair of the projections on the plate and disc. Between the front driving disc and the front clutch release plate is located a ring 30, which is similar to the ring 26, which is shown in Figures 1 to 3. Each of the driving discs 22 and 28 and the ring 30 are secured to the flywheel so as to be axially movable but rotatably immovable with respect thereto.

The driving and driven discs of the clutches shown in the drawings are normally maintained in engagement one with the other so as operatively to connect the crankshaft 10 with the transmission shaft 13 by the clutch spring 20. For moving the clutch release plate assembly forwardly against the resistance of the clutch spring so as to disconnect the transmission shaft from the crankshaft, there may be provided any suitable form of operating mechanism.

Assuming that the clutch release plate assembly is in such a position that the crankshaft is not operatively connected to the transmission shaft and it is desired to drive the transmission shaft from the crankshaft, the pressure exerted by the operating mechanism on the clutch release plate assembly is relieved and the clutch spring, consequently, moves the clutch release plate assembly rearwardly which causes engagement of the driving and driven discs and operatively connects the transmission shaft to the crankshaft. Before the transmission shaft can be driven from the crankshaft, the resilient ring 26 (or 30) must be distorted or warped until it is of what may be termed sinuous shape in edge elevation by the pressure applied on opposite sides thereof through the projections 25 (or 29). The necessity of warping or distorting the ring 26 (or 30) before the driving connection between the crankshaft and the transmission shaft is fully effected insures smooth and even engagement between the driving and driven discs and freedom from jerks as the clutch is thrown in.

When the clutch release plate assembly is moved forwardly to disconnect the transmission shaft from the crankshaft, the expansion of the ring 26 (or 30) to its normal, plane shape causes separation of the driving and driven discs and insures a sharp and clean separation thereof.

It will be noted that since the discs to which the friction facings are secured are not distorted under any circumstances, the facings will wear evenly and no noises or jerks resulting from uneven wear will occur.

Although I have described my invention as applied to a multiple disc clutch, I apprehend that certain features thereof may be incorporated in clutches of other designs and for this reason it is to be understood that the scope of my invention is to be limited only by the appended claims.

In the claims the term "idle" has been used to characterize the plate which is normally flat but which is distorted in the act of clutch engagement. This word "idle" is used to indicate that the plate is neither a driving nor a driven plate. It rotates with the plates on each side of it but does not operate as a driving plate to engage and rotate a driven plate, nor is it a driven plate to be engaged by or rotated by a driving plate.

I claim:

1. In a multiple disc clutch, a plurality of annular discs, a pair of annular discs interposed between a pair of the first-mentioned discs, projections formed on the juxtaposed faces of the second-mentioned discs, and a resilient ring located between the second-mentioned discs, and in engagement with the projections thereon and adapted to be distorted when the clutch is engaged.

2. In a multiple disc clutch, a plurality of driving discs, a plurality of driven discs, and a clutch release plate adjacent one of said discs, projections on the juxtaposed faces of the last-mentioned disc and the clutch release plate, and a resilient, normally plane member located between the last-mentioned disc and the clutch release plate and in engagement with the projections thereon and adapted to be distorted when the clutch is engaged.

3. In a clutch, the combination of two relatively non-rotatable clutch members, said members having projections on their adjacent faces, an independent resilient idle member located between the said first-mentioned members and in engagement with said projections, means to apply the clutch whereby increasing applied pressure is accompanied by distortion of the intermediate member between said projections to effect a gradual clutching action.

4. The invention defined by claim 3, said idle member being in the form of an annular plate concentric with said clutch members and rotatable therewith.

5. In a clutch, the combination of a pair of relatively non-rotatable elements, a second pair of relatively non-rotatable elements, the elements of the second pair being located between the elements of the first pair, an independent resilient member located between and rotatable with the elements of the second pair and having spaced points of engagement with said elements of the second pair whereby said resilient member may be distorted between said points of engagement to effect a gradual clutching action.

6. The invention defined by claim 5, the spaced points of engagement of the resilient member with the elements of the second pair being in alternate relation whereby, under the influence of applied pressure, the resilient member may assume a wave form.

In testimony whereof I affix my signature.

WILLIAM R. COUGHTRY.